(12) United States Patent
Lee et al.

(10) Patent No.: US 8,592,080 B2
(45) Date of Patent: Nov. 26, 2013

(54) SECONDARY BATTERY

(75) Inventors: Chiyoung Lee, Suwon-si (KR); Tatsuya Hashimoto, Suwon-si (KR); Sangeun Cheon, Suwon-si (KR); Seokyoon Yoo, Suwon-si (KR); Dongwook Kim, Suwon-si (KR); Jongseok Moon, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 555 days.

(21) Appl. No.: 12/805,165

(22) Filed: Jul. 15, 2010

(65) Prior Publication Data
US 2011/0052978 A1    Mar. 3, 2011

(30) Foreign Application Priority Data

Aug. 26, 2009    (KR) ................ 10-2009-0079177

(51) Int. Cl.
*H01M 2/08* (2006.01)
*H01M 2/36* (2006.01)

(52) U.S. Cl.
USPC .................................. 429/185; 429/174

(58) Field of Classification Search
None
See application file for complete search history.

(56) References Cited

U.S. PATENT DOCUMENTS

| | | | |
|---|---|---|---|
| 4,980,249 A | 12/1990 | Isoi et al. | |
| 7,666,552 B2 * | 2/2010 | Kim | 429/254 |
| 2007/0224491 A1 * | 9/2007 | Woo | 429/72 |

FOREIGN PATENT DOCUMENTS

| | | | |
|---|---|---|---|
| JP | 06-021177 Y2 | | 6/1994 |
| JP | 11-149915 | * | 6/1999 |
| JP | 11-149915 A | | 6/1999 |
| KR | 20-1987-0000397 Y1 | | 2/1987 |
| KR | 10 2006-0037624 A | | 5/2006 |
| KR | 10-0635744 B1 | | 10/2006 |
| KR | 10 2007-00923 A | | 9/2007 |

* cited by examiner

*Primary Examiner* — John S Maples
(74) *Attorney, Agent, or Firm* — Lee & Morse, P.C.

(57) ABSTRACT

A secondary battery including an electrode assembly, a can accommodating the electrode assembly, a cap plate coupled to the can, an electrolyte injection unit including an injection hole penetrating the cap plate and an injection ring protruding from the injection hole, and a stopper to seal the electrolyte injection unit.

13 Claims, 5 Drawing Sheets

SECONDARY BATTERY

BACKGROUND

1. Field

Embodiments relate to a secondary battery.

2. Description of the Related Art

A secondary battery may be manufactured in various shapes, e.g., cylindrical and polygonal. The secondary battery may include an electrode assembly formed by winding a band-shaped positive electrode plate, a band-shaped negative electrode plate, and a separator interposed between the positive and negative electrode plates into a jelly-roll structure. Alternatively, a secondary battery may be formed by laminating a plurality of positive electrode plates, negative electrode plates, and separators. The electrode assembly may be accommodated in a case and then a cap assembly having external terminals may be coupled to the case to complete the secondary battery.

The cap assembly may have an electrolyte injection hole to provide a passage for injecting electrolyte into the case. The cap assembly may also have a stopper fitted into the electrolyte injection hole to prevent the electrolyte in the case from leaking out.

SUMMARY

Embodiments are directed to a secondary battery, which represents and advance in the related art.

It is a feature of an embodiment to provide a secondary battery having an improved electrolyte injection hole and stopper sealing the electrolyte injection hole so that sealing is improved and residual electrolyte therein may be easily washed out.

At least one of the above and other features and advantages may be realized by providing a secondary battery including an electrode assembly, a can accommodating the electrode assembly, a cap plate coupled to the can, an electrolyte injection unit including an injection hole penetrating the cap plate and an injection ring protruding from the injection hole, and a stopper to seal the electrolyte injection unit.

The injection ring may include an inner circumferential surface and an outer circumferential surface, the cap plate may include a top surface and a bottom surface, and a thickness of the injection ring between the inner circumferential surface and the outer circumferential surface may be less than a thickness of the cap plate between the top surface and the bottom surface.

The injection ring may be integrally formed with the cap plate.

The injection ring may have an upper end, the upper end being disposed higher than a top surface of the cap plate.

The cap plate may include an external groove disposed at an outer circumferential surface of the injection ring, the injection ring being disposed in the external groove, and the injection ring may have an upper end laying in the same plane as or lower than a top surface of the cap plate.

The cap plate may include top and bottom surfaces, the injection ring may include an inner circumferential surface, and the external groove may be defined by the outer circumferential surface of the injection ring, a first surface lower than the top surface of the cap plate, and a second surface connecting the first surface to the top surface of the cap plate.

A thickness of the injection ring between the inner circumferential surface and the outer circumferential surface may be less than a thickness of a portion of the cap plate between the first surface and the bottom surface.

The injection ring may be coupled to the cap plate.

The injection ring may have an upper end, the upper end being disposed higher than a top surface of the cap plate.

The cap plate may include an external groove disposed at an outer circumferential surface of the injection ring, the injection ring being disposed in the external groove, and the injection ring may have an upper end laying in the same plane as or lower than a top surface of the cap plate.

The cap plate may include top and bottom surfaces, the injection ring may include an inner circumferential surface, and the external groove may be defined by the outer circumferential surface of the injection ring, a first surface lower than the top surface of the cap plate, and a second surface connecting the first surface to the top surface of the cap plate.

A thickness of the injection ring between the inner circumferential surface and the outer circumferential surface may be less than a thickness of a portion of the cap plate between the first surface and the bottom surface.

The injection ring may have a funnel shape in which a diameter of an upper end is greater than a diameter of a lower end.

The stopper may have a truncated conical shape.

The stopper may be disposed higher than the injection ring.

The stopper may be coupled to the injection ring by pressure.

The injection ring may be welded to the stopper.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
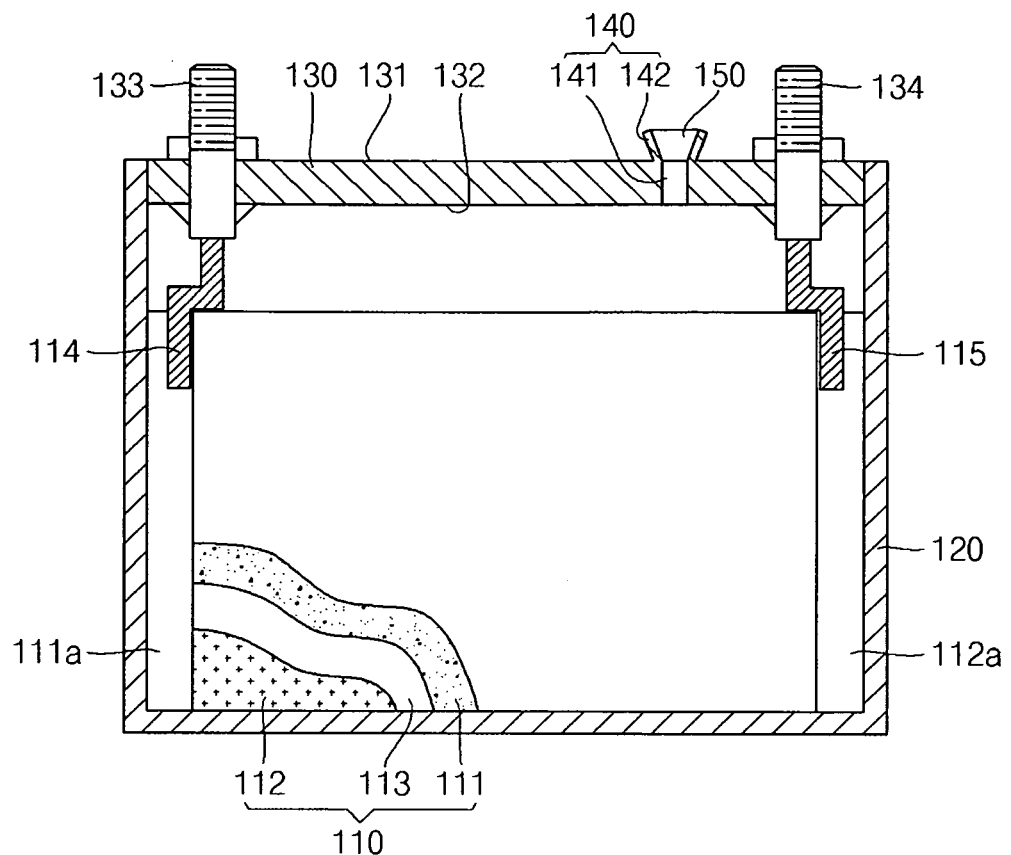
FIG. 1 illustrates a cross sectional view of a secondary battery according to an embodiment.

Korean Patent Application No. 10-2009-0079177, filed on Aug. 26, 2009, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Terms such as "top," "bottom," "higher," and "lower" will similarly be understood to describe relative relationships only rather than any kind of absolute disposition or location. Like reference numerals refer to like elements throughout.

FIG. 1 illustrates a sectional view of a secondary battery according to an embodiment. Referring to FIG. 1, a secondary battery 100 according to an embodiment may include an electrode assembly 110, a can 120 to accommodate the electrode assembly 110, a cap plate 130 coupled to a top opening of the can 120, an electrolyte injection unit 140 in the cap plate 130 to inject an electrolyte, and a stopper 150 to seal the electrolyte injection unit 140.

The electrode assembly 110 may be obtained by winding a positive electrode plate 111, in which a positive electrode coating portion is coated on a surface of a positive electrode collector, a negative electrode plate 112, in which a negative electrode coating portion is coated on a surface of a negative electrode collector, and a separator 113 interposed between the positive and negative electrode plates to insulate the same from each other, into a jelly-roll structure. The electrode assembly 110 may include a positive electrode tab 114 on a side thereof and a negative electrode tab 115 on another side thereof.

The positive electrode collector of the positive electrode plate 111 may be made of, e.g., a conductive metal, that collects electrons from the positive electrode coating portion and transports the electrons to an external circuit. The positive electrode coating portion may be prepared by mixing a positive electrode active material, a conductive material, and a binder. The positive electrode coating portion may be coated on the positive electrode collector at a predetermined thickness. A positive electrode non-coating portion 111a, on which the positive electrode coating portion is not coated, may be formed on the positive electrode collector. A positive electrode tab 114 may be welded to a side of the positive electrode non-coating portion 111a. The positive electrode tab 114 may be electrically connected to a positive terminal 131 disposed on the cap plate 130.

The negative electrode collector of the negative electrode plate 112 may be made of, e.g., a conductive metal, that collects electrons from the negative electrode coating portion and transports the electrons to the external circuit. The negative electrode coating portion may be prepared by mixing a negative electrode active material, a conductive material, and a binder. The negative electrode coating portion may be coated on the negative electrode collector at a predetermined thickness. A negative electrode non-coating portion 112a, on which the negative electrode coating portion is not coated, may be formed on the negative electrode collector. A negative electrode tab 115 may be welded to a side of the negative electrode non-coating portion 112a. The negative electrode tab 115 may be electrically connected to a negative terminal 132 disposed on the cap plate 130.

The separator 113 may be disposed between the positive electrode plate 111 and the negative electrode plate 112. The separator 113 may surround an outer circumference of the electrode assembly 110. The separator 113 may prevent short-circuits between the positive electrode plate 111 and the negative electrode plate 112. The separator 113 may be made of, e.g., a porous polymeric membrane to allow lithium ions to pass therethrough.

The can 120 may have a cubic or other polygonal shape to accommodate the electrode assembly 110. The top opening of the can 120 may be open and the top opening may be sealed after the electrode assembly 110 is inserted therethrough. The can 120 may be made of an electrically conductive metal, e.g., aluminum, an aluminum alloy, and/or nickel-plated steel.

The cap plate 130 may include a top surface 131, a bottom surface 132 opposite to the top surface 131, a positive electrode terminal 133 connected to the positive electrode tab 114, and a negative electrode terminal 134 connected to the negative electrode tab 115. The cap plate 130 may be coupled to the top opening of the can 120 to seal the can 120.

The electrode injection unit 140 may be disposed on a side of the cap plate 130. The electrode injection unit 140 may include an injection hole 141 penetrating the cap plate 130 and an injection ring 142 protruding from the cap plate 130.

The injection hole 141 may have a cylindrical shape penetrating the cap plate 130. In other words, an inner circumferential surface of the injection hole 141 may be approximately perpendicular to the top surface 131 and the bottom surface 132 of the cap plate 130, but is not limited thereto.

The injection ring 142 may protrude from the injection hole 141. A lower end diameter of the injection ring 142 may be the same as a diameter of an upper end of the injection hole 141. The injection ring 142 may be disposed on the top surface 131 of the cap plate 130. The injection ring 142 may have a funnel shape in which an upper end diameter thereof is larger than the lower end diameter thereof, when a stopper 150 is fitted therein.

The injection ring 142 may be integrally formed with the cap plate 130—and, in particular, may be one piece with the cap plate 130—by, e.g., machining or pressing the cap plate 130. Alternatively, the injection ring 142 may be a separate piece coupled to the top surface 131 of the cap plate 130 by, e.g., laser-welding.

The electrolyte injection unit 140 will now be described with reference to the accompanying drawings. The electrolyte injection unit 140 may be sealed by the stopper 150 after an electrolyte is injected into the can 120. The stopper 150 may have upper and lower ends, and may have a truncated conical shape in which an upper end diameter thereof is greater than a lower end diameter. Further, a height of the stopper 150 may be higher than that of the injection ring 142.

The stopper 150 may be fitted into the injection ring 142 of the electrolyte injection unit 140 by pressure. Portions of the injection ring 142 may be deformed to an angle corresponding to sides of the stopper 150 such that the injection ring 142 may have a funnel shape. The stopper 150 may securely seal the electrolyte injection unit 140 by, e.g., laser-welding.

The stopper 150 may be made of a conductive metal, e.g., aluminum, an aluminum alloy, and/or nickel-plated steel, or may be made of the same material as that of the injection ring 142.

As described above, the stopper 150 may be fitted into the injection ring 142 by pressure. Portions of the injection ring 142 may be deformed to the angle corresponding to sides of the stopper 150 such that there is no gap between the stopper 150 and the injection ring 142, ensuring a secure seal.

Because it may be difficult to wash out residual electrolyte between a stopper and an injection hole of an electrolyte injection unit having a step disposed in the cap plate, the electrolyte injection unit 140 of an embodiment protruding from the cap plate 130 may facilitate washing of any residual electrolyte in the electrolyte injection unit 140.

Figure 2A:
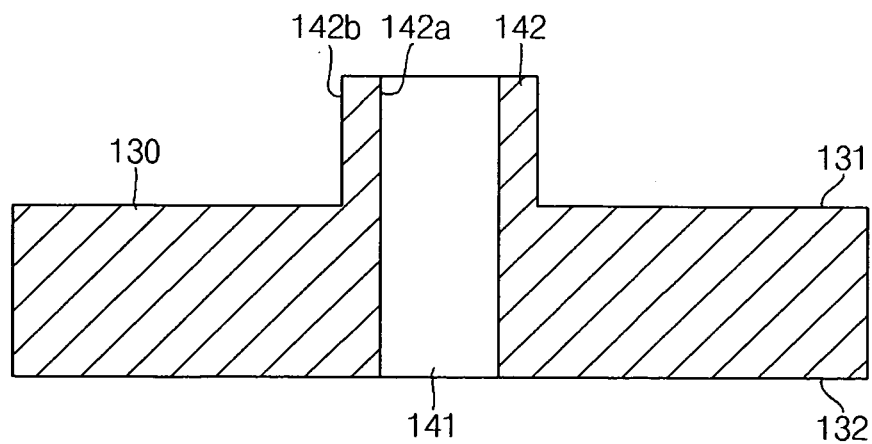
FIGS. 2A and 2B illustrate enlarged sectional views of an electrolyte injection hole of FIG. 1.
Figure 2B:
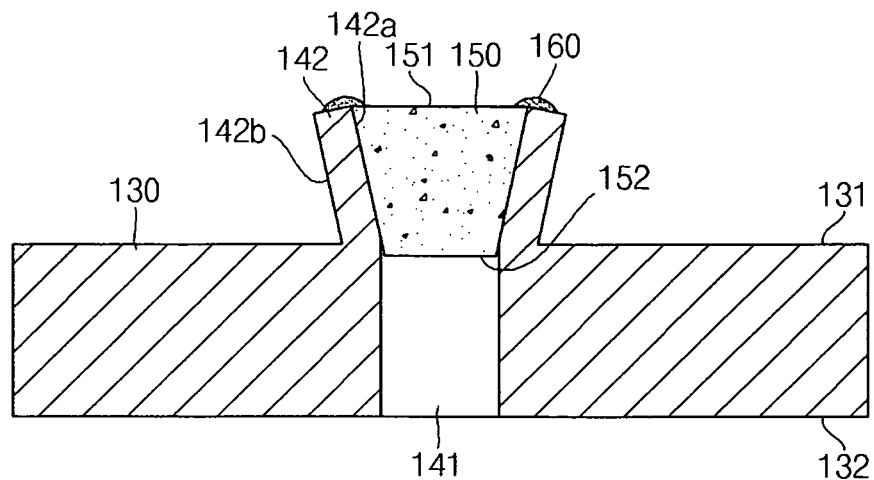

The electrolyte injection unit 140 will be described in detail with reference to FIGS. 2A to 5B. FIGS. 2A and 2B illustrate enlarged sectional views of the electrolyte injection unit 140 of FIG. 1.

Referring to FIGS. 2A and 2B, the electrolyte injection unit 140 may be integrally formed with the cap plate 130 by, e.g., machining or pressing the cap plate 130. The electrolyte injection unit 140 may include the injection hole 141 and the injection ring 142.

The injection ring 142 may have an inner circumferential surface 142a and an outer circumferential surface 142b. The injection ring 142 may include an upper end disposed higher than the top surface 131 of the cap plate 130. The injection ring 142 may have a cylindrical shape in which the upper end has a diameter the same as a diameter of the lower end. The injection ring 142 may have a same diameter as a diameter of the injection hole 141, prior to insertion of the stopper 150.

The stopper 150 may include an upper end 151 and a bottom end 152. The stopper 150 may have a truncated conical shape in which the upper end 151 has a diameter greater than the diameter of the injection ring 142. The lower end 152 may have a diameter smaller than the diameter of the injection ring 142.

After the electrolyte is injected through the electrolyte injection unit 140, the stopper 150 may be fitted into the electrolyte injection unit 140 by pressure. By applying pressure, portions of the injection ring 142 may be deformed to an angle corresponding to sides of the stopper 150. After the stopper 150 is fitted into the injection ring 142, the injection ring 142 may be deformed into a funnel-like shape in which an upper end diameter is greater than a lower end diameter thereof.

For easy deformation of the injection ring 142, a thickness of the injection ring 142 between the inner circumferential surface 142a and the outer circumferential surface 142b may be less than a thickness of the cap plate 130 between the top and bottom surfaces 131 and 132 thereof. In addition, the upper end 151 of the stopper 150 may be disposed higher than an upper end of the injection ring 142, thereby increasing coupling force between the stopper 150 and the injection ring 142.

After the electrolyte is injected through the electrolyte injection unit 140, the stopper 150 may be inserted and, e.g., laser welding, may be carried out along a portion where the upper end 151 of the stopper 150 and the injection ring 142 are coupled to each other. Thus, a welding region 160 may be formed on the portion in which the upper end 151 of the stopper 150 and the injection ring 142 are coupled to each other. In particular, the stopper 150 and the injection ring 142 may be melted together by, e.g., laser welding, and then cooled to form the welding region 160. Thus, the electrolyte injection unit 140 may be coupled to the stopper 150 and may be securely sealed by, e.g., laser-welding. In addition, the injection ring 142 of the electrolyte injection unit 140 may protrude such that any residual electrolyte may be easily washed out.

Figure 3A:
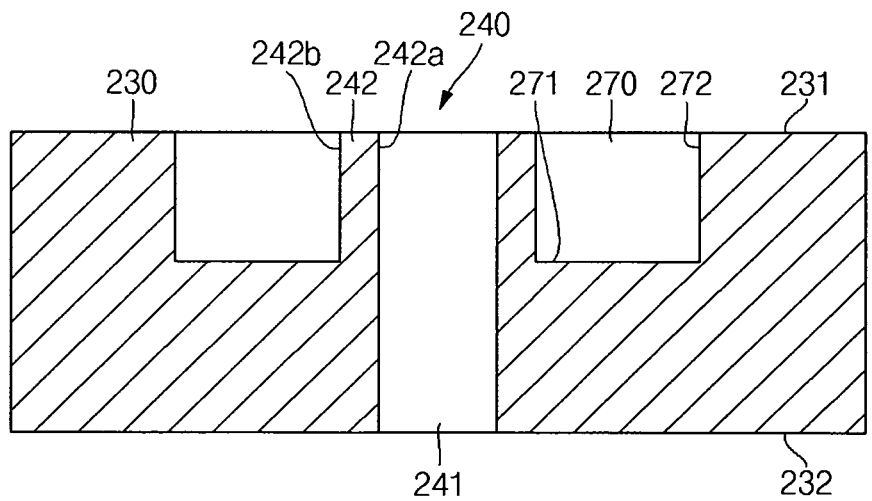
FIGS. 3A and 3B illustrate enlarged sectional views of an electrolyte injection hole of a secondary battery according to another embodiment.
Figure 3B:
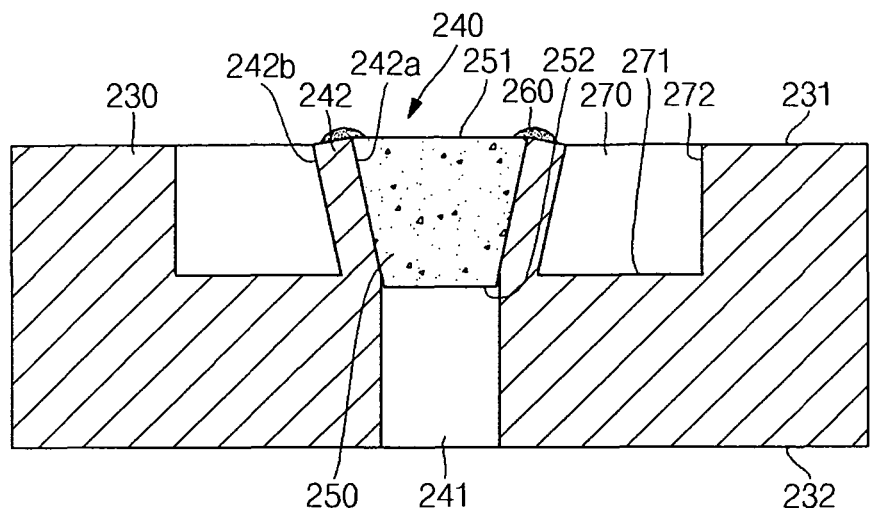

FIGS. 3A and 3B illustrate enlarged sectional views of an electrolyte injection unit of a secondary battery according to another embodiment. An electrolyte injection unit 240 illustrated in FIGS. 3A and 3B is similar to the electrolyte injection unit 140 of FIGS. 2A and 2B and only differences therebetween will be described.

Referring to FIGS. 3A and 3B, the electrolyte injection unit 240 may be integrally formed with a cap plate 230 by, e.g., machining or pressing the cap plate 230. The electrolyte injection unit 240 may include an injection hole 241 and an injection ring 242. The injection ring 242 may have an upper end in the same plane as, or lower than, a top surface 231 of the cap plate 230. The electrolyte injection unit 240 may be obtained by forming an external annular groove 270 at an outer circumferential surface 242b of the injection ring 242 to surround the injection ring 242.

The external annular groove 270 may be defined by the outer circumferential surface 242b of the injection ring 242, a first surface 271 lower than the top surface 231 of the cap plate 230, and a second surface 272 connecting the first surface 271 to the top surface 231 of the cap plate 230.

When the stopper 250 is fitted into the injection ring 242, the injection ring 242 may be deformed to an angle corresponding to sides of the stopper 250. In this case, for easy deformation of the injection ring 242, a thickness of the injection ring 142 between the inner circumferential surface 242a and the outer circumferential surface 242b may be less than a thickness of the cap plate 230 between the first surface 271 and a bottom surface 232 thereof.

Figure 4A:
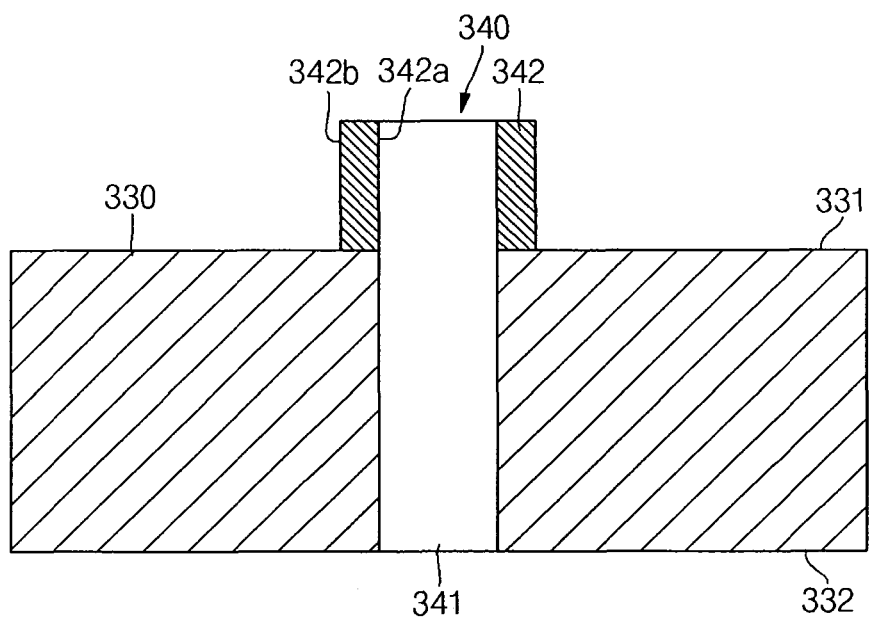
FIGS. 4A and 4B illustrate enlarged sectional views of an electrolyte injection hole of a secondary battery according to yet another embodiment.
Figure 4B:
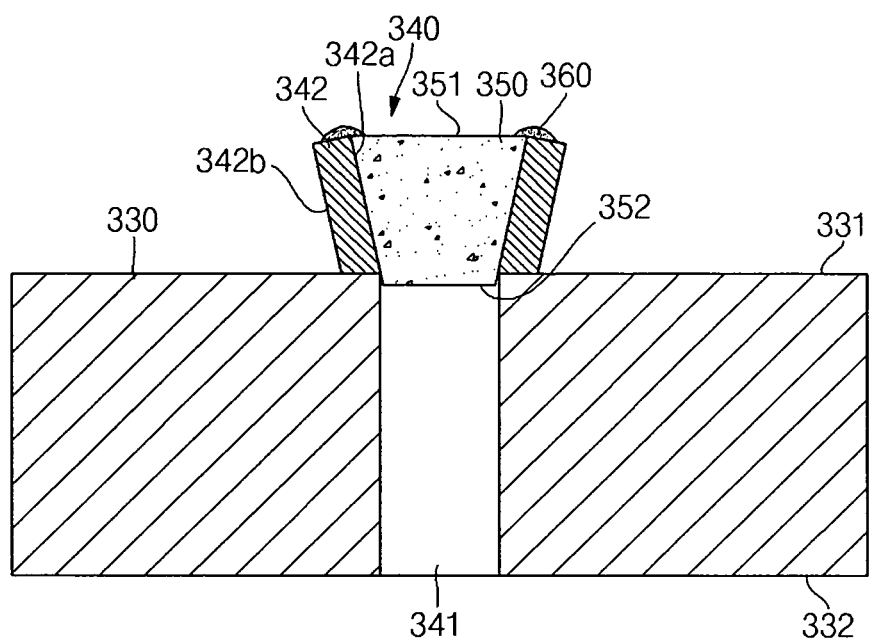

FIGS. 4A and 4B illustrate enlarged sectional views of an electrolyte injection unit of a secondary battery according to yet another embodiment. Referring to FIGS. 4A and 4B, an electrolyte injection unit 340 may include an injection hole 341 and an injection ring 342. The injection ring 342 may be coupled to a cap plate 330.

An upper end of the injection ring 342 may be higher than a top surface 331 of the cap plate 330. Further, the injection ring 342 may be coupled to the cap plate 330 at an upper end of the injection hole 341 by, e.g., laser-welding. The injection ring 342 may be made of, e.g., a flexible material or the same material as that the cap plate 330. The injection ring 342 may include an inner circumferential surface 342a and an outer circumferential surface 342b.

Because the injection ring 342 may be made of a flexible material, the injection ring 342 may be deformed when the injection hole 341 is sealed with a stopper 350, thereby enhancing sealing of the secondary battery. In addition, when the injection ring 342 is welded to, and protrudes from, the cap plate 330, any residual electrolyte in the electrolyte injection unit 340 may be easily washed out.

Figure 5A:
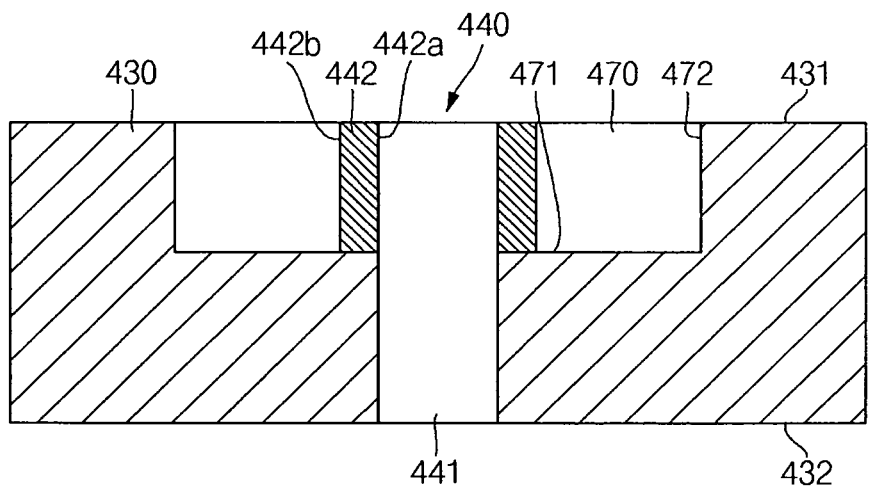
FIGS. 5A and 5B illustrate enlarged sectional views of an electrolyte injection hole of a secondary battery according to still another embodiment.
Figure 5B:
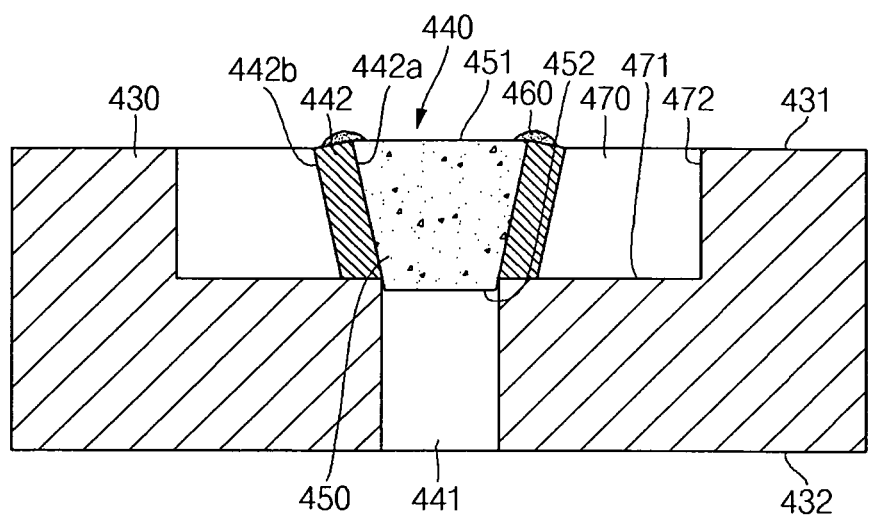

FIGS. 5A and 5B illustrate enlarged sectional views of an electrolyte injection unit of a secondary battery according to still another embodiment. Referring to FIGS. 5A and 5B, an electrolyte injection unit 440 may include an injection hole 441 and an injection ring 442. The injection ring 442 may be coupled to a cap plate 430 after forming the cap plate 430.

An upper end of the injection ring 442 may lay in the same plane as, or lower than, a top surface 431 of the cap plate 430. The injection ring 442 may be coupled to the cap plate 430 by, e.g., laser-welding. The injection ring 442 may be made of, e.g., a flexible material or the same material as that the cap plate 430.

When the injection ring 442 is welded to the cap plate 430, an external annular groove 470 may be formed on the cap plate 430. The external annular groove 470 may be defined by an outer circumferential surface 442b of the injection ring 442, a first surface 471 lower than the top surface 431 of the cap plate 430, and a second surface 472 connecting the top surface 431 of the cap plate 430 to the first surface 471.

When a stopper 450 is fitted into the injection ring 442, the injection ring 442 may be deformed to an angle corresponding to sides of the stopper 450. In order to easily deform the injection ring 442, a thickness of the injection ring 442 between the inner circumferential surface 442a and the outer circumferential surface 442b may be less than a thickness of the cap plate 430 between the first surface 471 and the bottom surface 432.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising;
an electrode assembly;
a can accommodating the electrode assembly;
a cap plate coupled to the can;
an electrolyte injection unit including an injection hole penetrating the cap plate and an injection ring protruding from the injection hole; and
a stopper to seal the electrolyte injection unit,
wherein the stopper has a truncated conical shape in which a diameter of an upper end is greater than a diameter of a lower end,
wherein the stopper is coupled to the injection ring by pressure and the injection ring is deformed to an angle corresponding to sides of the stopper, and
wherein the injection ring has a funnel shape in which a diameter of an upper end is greater than a diameter of a lower end.

2. The secondary battery as claimed in claim 1, wherein:
the injection ring includes an inner circumferential surface and an outer circumferential surface,
the cap plate includes a top surface and a bottom surface, and
a thickness of the injection ring between the inner circumferential surface and the outer circumferential surface is less than a thickness of the cap plate between the top surface and the bottom surface.

3. The secondary battery as claimed in claim 1, wherein the injection ring is integrally formed with the cap plate.

4. The secondary battery as claimed in claim 3, wherein the injection ring has an upper end, the upper end being disposed higher than a top surface of the cap plate.

5. The secondary battery as claimed in claim 3, wherein:
the cap plate includes an external groove disposed at an outer circumferential surface of the injection ring, the injection ring being disposed in the external groove, and the injection ring has an upper end laying in the same plane as or lower than a top surface of the cap plate.

6. The secondary battery as claimed in claim 5, wherein:
the cap plate includes top and bottom surfaces,
the injection ring includes an inner circumferential surface, and
the external groove is defined by the outer circumferential surface of the injection ring, a first surface lower than the top surface of the cap plate, and a second surface connecting the first surface to the top surface of the cap plate.

7. The secondary battery as claimed in claim 6, wherein a thickness of the injection ring between the inner circumferential surface and the outer circumferential surface is less than a thickness of a portion of the cap plate between the first surface and the bottom surface.

8. The secondary battery as claimed in claim 1, wherein the injection ring is coupled to the cap plate.

9. The secondary battery as claimed in claim 8, wherein the injection ring has an upper end, the upper end being disposed higher than a top surface of the cap plate.

10. The secondary battery as claimed in claim 8, wherein:
the cap plate includes an external groove disposed at an outer circumferential surface of the injection ring, the injection ring being disposed in the external groove, and
the injection ring has an upper end laying in the same plane as or lower than a top surface of the cap plate.

11. The secondary battery as claimed in claim 10, wherein:
the cap plate includes top and bottom surfaces;
the injection ring includes an inner circumferential surface; and
the external groove is defined by the outer circumferential surface of the injection ring, a first surface lower than the top surface of the cap plate, and a second surface connecting the first surface to the top surface of the cap plate.

12. The secondary battery as claimed in claim 11, wherein a thickness of the injection ring between the inner circumferential surface and the outer circumferential surface is less than a thickness of a portion of the cap plate between the first surface and the bottom surface.

13. The secondary battery as claimed in claim 1, wherein the injection ring is welded to the stopper.

* * * * *